United States Patent [19]

Yamamoto et al.

[11] Patent Number: 4,830,062
[45] Date of Patent: May 16, 1989

[54] POROUS HEAT-SHRINKABLE TETRAFLUOROETHYLENE POLYMER TUBE AND PROCESS FOR PRODUCING THE SAME

[75] Inventors: Katsutoshi Yamamoto, Settsu; Norimasa Honda, both of Osaka, Japan

[73] Assignee: Daikin Industries, Ltd., Osaka, Japan

[21] Appl. No.: 55,072

[22] Filed: May 28, 1987

[30] Foreign Application Priority Data

May 28, 1986 [JP] Japan ................................ 61-122919

[51] Int. Cl.$^4$ ........................... F16L 9/12; C08J 9/00
[52] U.S. Cl. ..................................... 138/177; 264/127
[58] Field of Search ......... 138/118, 177, 178, DIG. 3; 174/DIG. 8; 264/41, 127; 428/36

[56] References Cited

U.S. PATENT DOCUMENTS 4,110,392  8/1978  Yamazaki ........................ 264/41 X
4,332,035  6/1982  Mano .................................... 623/12

Primary Examiner—Werner H. Schroeder
Attorney, Agent, or Firm—Birch, Stewart, Kolasch & Birch

[57] ABSTRACT

A tetrafluoroethylene polymer tube which is in a porous form composed of continuous pores and has heat-shrinkability in a radial direction or both radial direction and longitudinal direction of the tube, and a process for producing the same comprising applying pressure into inside of a tetrafluoroethylene polymer tube formed by paste extrusion molding a powder of the tetrafluoroethylene polymer and then sintered while heating the same to a temperature of not higher than the melting initiation temperature of the tetrafluoroethylene polymer to expand the tube to a radial direction only or both radial direction and longitudinal direction of the tube, and then cooling the tube in a pressurized state.

5 Claims, 12 Drawing Sheets

Temperature (°C)

POROUS HEAT-SHRINKABLE TETRAFLUOROETHYLENE POLYMER TUBE AND PROCESS FOR PRODUCING THE SAME

FIELD OF THE INVENTION

The present invention relates to a tetrafluoroethylene polymer (hereinafter, referred to as "TFE polymer") tube which is in a porous form composed of continuous pores, and has heat-shrinkability in the radial direction or both the radial direction and the longitudinal direction and also to a process for producing the same.

BACKGROUND OF THE INVENTION

Hitherto, as a process for producing a porous TFE polymer tube, there is known a production process thereof by expanding an unsintered tubular product of a paste extrusion-molded TFE polymer to the radial direction of the tube and thereafter heat-treating the tube at a temperature of at least the melting point of the TFE polymer (Japanese Patent publication No. 17216/81 which corresponds to U.S. Pat. No. 3,953,566).

Also, as a process for producing a non-porous TFE polymer tube having heat-shrinkability, there is known a production process thereof by imparting stress to a TFE polymer tube at a temperature within the range of from the softening point thereof to the pour point thereof to expand the tube and immediately fixing it by cooling (Japanese Patent Publication No. 29635/71).

However, the porous TFE polymer tube obtained by the former production process is poor in heat shrinkability, while the TFE polymer tube obtained by the latter production process has heat shrinkability but is not porous. Thus, a TFE polymer tube which is porous and has heat shrinkability and a production process of such a TFE tube have not yet been known.

SUMMARY OF THE INVENTION

An object of the present invention is, therefore, to provide a porous TFE polymer tube having heat shrinkability.

Another object of the present invention is to provide a process for providing the aforesaid porous heat-shrinkable TFE polymer tube.

That is, according to the present invention, there is provided a tube which comprises a porous TFE polymer and has heat shrinkability.

According to another embodiment of the present invention, there is also provided a process for producing a porous heat-shrinkable TFE polymer tube by applying pressure into the inside of a TFE polymer tube which was formed by paste extrusion molding TFE polymer powder and then sintered while heating it to a temperature of not higher than the melting initiation temperature of the TFE polymer to expand the tube to the radial direction or both the radial direction and the longitudinal direction of the tube, and thereafter cooling the tube in the pressurized state.

DETAILED DESCRIPTION OF THE INVENTION

The term "TFE polymer" used in the present invention means not only a homopolymer of tetrafluoroethylene but also a so-called modified polytetrafluoroethylene (PTFE) obtained by copolymerizing tetrafluoroethylene and not more than 2% by weight, and particularly from 0.01% to 1% by weight of copolymerizable monomer(s). Such a modified PTFE is called a "TFE copolymer" in this specification.

The porosity of the porous tube of the present invention is from 10 to 80% and particularly from 20 to 60% and the gas permeability thereof is from 100 to 100,000 sec./100 c.c., and particularly from 1,000 to 50,000 sec./100 c.c.

The porosity of the TFE tube is calculated by the following equation;

$$\text{Porosity} = \frac{(A) - (B)}{(A)} \times 100$$

(A): Density of TFE polymer tube before thermal expansion (B): Density of TFE polymer tube after thermal expansion Also, the gas permeability of the porous polymer tube can be measured according to the method of JIS P-8117-1980.

The porous tube of the present invention is produced by paste extrusion-molding a TFE polymer powder to form a TFE polymer tube, sintering the TFE polymer tube, applying pressure into the inside of the tube while heating the tube at temperature below the melting initiation temperature of the TFE polymer to expand the tube to the radial direction thereof or both the radial direction and longitudinal direction thereof, and then cooling the tube in the pressurized state.

One of the features of the production process of the present invention is to produce the porous TFE polymer tube from a sintered TFE polymer tube. This is because in the case of using an unsintered TFE polymer tube, the tube frequently cracks in the expansion step, which is undesirable.

In the process of the present invention, for the TFE polymer powder, a homopolymer of TFE can be used but it is preferred to use a copolymer of TFE and not more than 2% by weight of comonomer(s) such as perfluoroalkyl vinyl ether, chrolotrifluoroethylene, hexafluoropropylene, etc., since in this case, a uniform porous tube is obtained.

Then, heat treatment for the TFE polymer tube at the application of pressure in the inside of the tube in the process of the present invention is explained.

Figure 1:
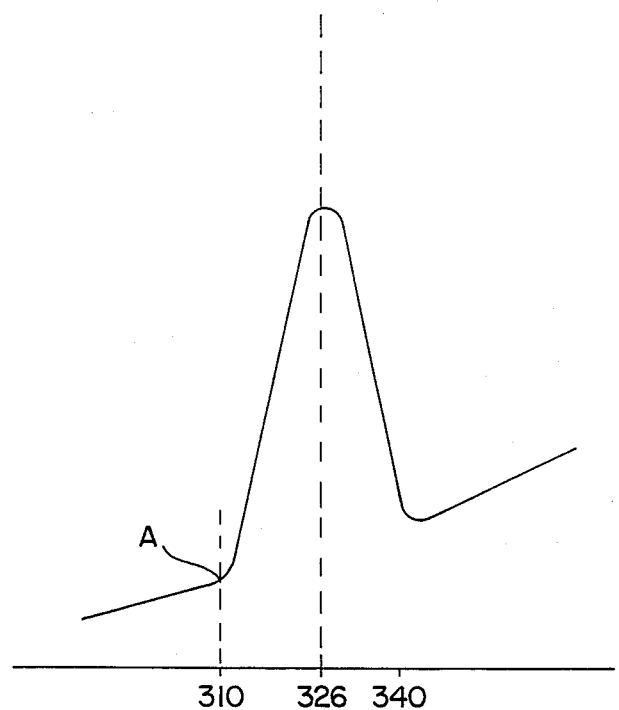
FIG. 1 is a graph showing the melting characteristics of a TFE polymer after sintering by a differential scanning carolimeter (hereinafter, referred to as "DSC")

The heating temperature must be below the melting initiation temperature of the TFE polymer after sintering. In the melting characteristics of the TFE polymer after sintering, as shown in FIG. 1 as the crystal melting curve of a TFE polymer by DSC, there is a sharp endothermic peak at about 326° C. and the curve gently slopes in both sides of the peak. The "melting initiation temperature" of the TFE polymer in the process of the present invention is defined to be the temperature raising for the endothermic peak in the crystal melting temperature curve by DSC. viz., portion A in FIG. 1.

The melting characteristics, particularly the melting temperature range, of the TFE polymer change to some extent according to the molecular weight and the distribution thereof, the kind of copolymerizable monomer(s) used for the TFE polymer, the cooling condition, etc., and also the melting initiation temperature changes according to the change of the melting characteristics. On considering this point, the upper limit of the heating temperature in the present invention is usually about 310° C., preferably about 300° C. On the other hand, the process of the present invention can be practiced at the heating temperature of not higher than 310° C. but as the temperature is lower, the pressure applied for expanding the polymer tube is required to be higher. Accordingly, it is preferred that the heating temperature is about 250° C. or higher.

In addition, when the sintered TFE polymer tube is heated to a temperature higher than the melting initiation temperature of the polymer, the polymer tube becomes non-porous and a porous polymer tube is not obtained as shown in comparison examples described hereinbelow.

Figure 2:
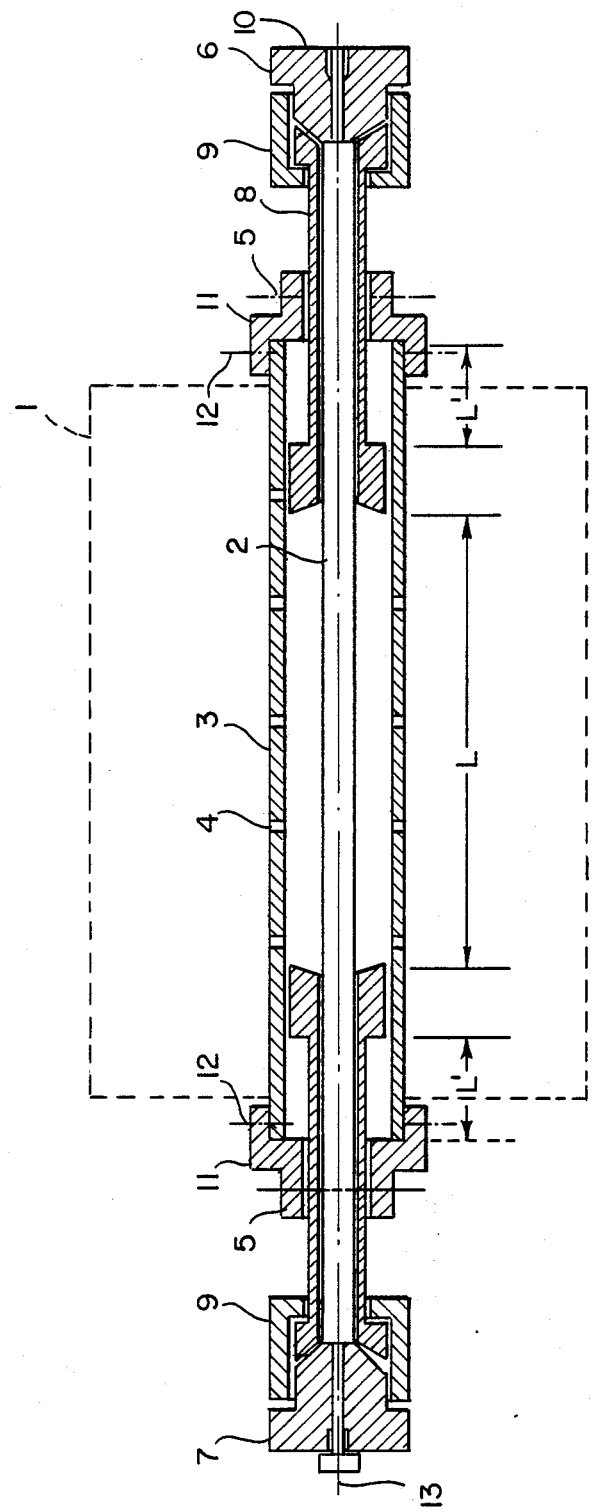
FIG. 2 is a sectional side view showing one embodiment of an apparatus for use in the present invention.

Then, the process of the present invention is explained by referring to an apparatus shown in FIG. 2. FIG. 2 is a sectional side view showing an embodiment of an apparatus suitable for practicing the process of the present invention.

In FIG. 2, a TFE polymer tube 2 before expansion is coaxially inserted in a pair of expansion restraining tubes 8. The right end side of the TFE polymer tube 2 is connected to a pressurized air inlet nozzle 6. The pressurized air inlet nozzle 6 has a central hole 10, through which a pressurized gas is introduced into the inside of the TFE polymer tube 2 to apply pressure into the inside thereof. Also, the pressurized air inlet nozzle 6 has a screw formed on the outside wall thereof and can be fixed to a TFE polymer tube fitting jig 9 having a screw formed on the inside wall thereof by screwing.

On the other hand, the left side of the TFE polymer tube 2 is connected to a pressurized air outlet nozzle 7 having a screw valve 13. By opening the screw valve 13 after the completion of pressurizing, the inside pressure of the TFE polymer tube 2 can be reduced to normal pressure from the pressurized state. The expansion restraining tubes 8 can be slid along the inside wall of an outer tube 3 in the longitudinal direction thereof by a distance L', respectively. Also, the expansion restraining tubes 8 each can be fixed to each outer tube support 11 by each longitudinal expansion restraining screw nails 5. Each outer tube support 11 is fixed to the other tube 3 by means of screw nails 12 and does not move. The outer tube 3 has plural air vents 4, through which the pressurized gas flowing through the wall of the TFE polymer tube which becomes porous after expansion by heating can be exhausted.

The process of the present invention is performed by using the apparatus shown in FIG. 2 as follows.

The TFE polymer tube 2 is coaxially inserted in a pair of expansion restraining tubes 8 as described above and the expansion restraining tubes 8 are moved in the longitudinal direction thereof to determine the length L of the portion of the polymer tube to be expanded.

When the TFE polymer tube 2 is expanded to the radial direction only, each expansion restraining tube 8 is fixed to each outer tube support 11 by the longitudinal expansion restraining screw nails 5. In this case, since the expansion restraining tubes 8 do not move, the TFE polymer tube 2 can be expanded in the radial direction only within the range of the inside diameter of the outer tube 3.

When the polymer tube is expanded to both the radial direction and the longitudinal direction, the longitudinal direction restraining screw nails 5 are not fixed. In this case, since the expansion restraining tubes 8 are slidable in the longitudinal direction, the TFE polymer tube 2 can be expanded in the radial direction within the range of the inside diameter of the outer tube 3 and in the longitudinal direction by the length L', respectively.

Now, the apparatus is set in a heating furnace so as to be the portion 1 heated, and is heated so that the substantial temperature of the TFE polymer tube 2 becomes a definite temperature. After the substantial temperature of the TFE polymer tube 2 reaches the definite temperature, pressurized air is introduced into the polymer tube from the compressed air inlet nozzle 6 to expand the TFE polymer tube 2 to the radial direction or both the radial direction and the longitudinal direction. After finishing the expansion, the apparatus is taken out from the heating furnace and cooled in the pressurized state for the polymer tube. After cooling, the screw valve 13 of the pressurized air outlet nozzle 7 is opened, the polymer tube fitting jigs 9 are released, and the shaped product (porous polymer tube) is taken out therefrom.

Figure 3:
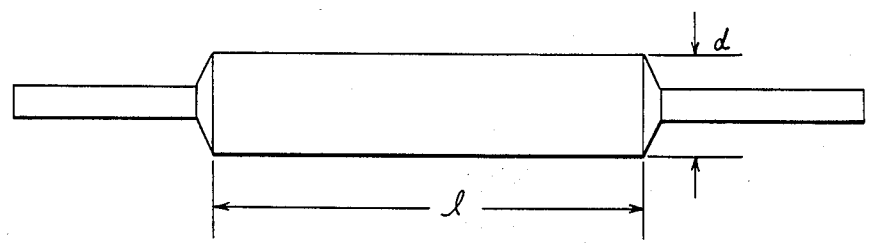
FIG. 3 is a schematic side view of an external form of a porous tube of the present invention.

FIG. 3 is a schematic external side view of the porous polymer tube obtained by the apparatus shown in FIG. 2. The tube product may be used as it is or the unexpanded end portions of the product may be cut off before use.

It is preferred that the expansion rate for the polymer tube is from 1.5 to 5 times in the radial direction and about 3 times or less in the longitudinal direction. If the expansion rate in the radial direction is less than 1.5 times, a porous tube having uniformly distributed micropores cannot be obtained and if the expansion rate is more than 5 times in the radial direction or 3 times in the longitudinal direction, the product becomes rupturable.

A feature of the porous TFE polymer tube of the present invention is in the point of possessing heat shrinkability. For example, in the case of using the porous polymer tube of the present invention as a cover for a porous metal pipe, the tube can be easily and closely fitted to the outer surface of the metal pipe by heat-shrinking the polymer tube to provide a solvent supplying metal pipe. Also, at the case of working the end portion of the tube, the joint working, etc., can be easily applied by utilizing the heat shrinkability.

Another feature of the porous tube of the present invention is that the pores of the tube are very fine. Accordingly, the polymer tube can be used as a high-performance filter as it is or after heat-shrinking.

Furthermore, the porous polymer tube of the present invention is excellent in mechanical strength and thus can be used as a pressure resistant filter.

Then, the invention is explained in more detail by the following examples.

EXAMPLE 1

A powder of a copolymer of tetrafluoroethylene and 0.25% by weight of chlorotrifluoroethylene was paste extrusion-molded at a draw ratio of 510:1 and the molded product was then sintered at 360° C. for 5 minutes to provide a TFE polymer tube of 7 mm in inside diameter and 1 mm in thickness. The polymer tube was mounted on the apparatus as shown in FIG. 2. In addition, the inside diameter of the outer tube 3 was 27 mm and the expansion span (L) was 400 mm. The longitudinal direction expansion restraining screw nails 5 of the apparatus were fixed to set the polymer tube so that the tube expanded in the radial direction only. The apparatus was placed in a heating furnace at 300° C. for 30 minutes to increase the substantial temperature of the TFE polymer tube to 300° C., thereafter, compressed air of 2.5 kg/cm² was continuously supplied into the polymer tube to pressurize the inside of the tube, and after 30 seconds since then, the apparatus was taken out from the furnace and cooled in the pressurized state.

After cooling, the apparatus was dismounted to provide a porous TFE tube having an outside diameter of 27 mm and an expanded portion length of 400 mm. In addition, the outside diameter and the expanded portion length of the polymer tube are (d) and (l), respectively, as shown in FIG. 3.

The expanded portion of the tube was opaque and white.

Figure 4:
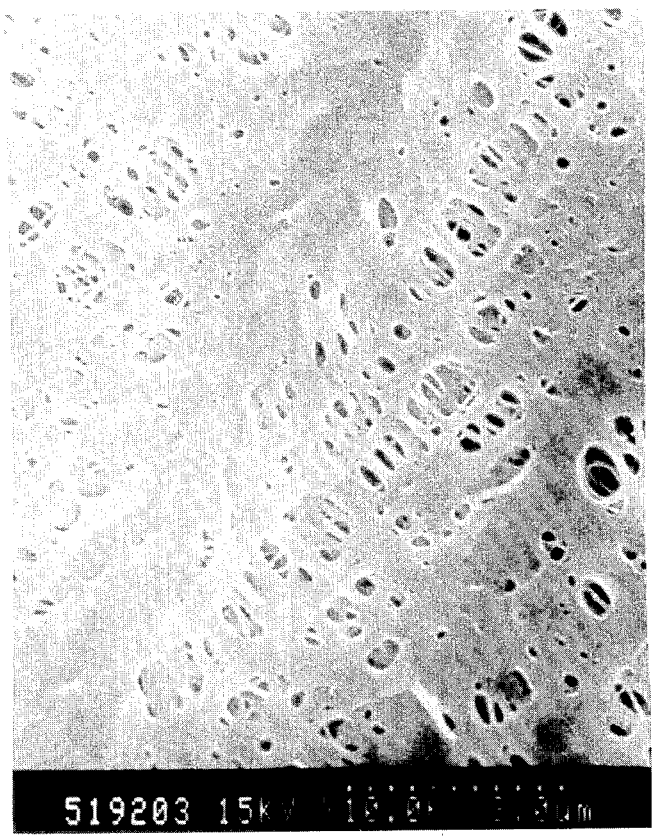
FIG. 4 is a scanning electron microphotograph (hereinafter, referred to as "SEM") of 10,000 magnifications showing the inside surface of the porous tube obtained in Example 1.
Figure 5:
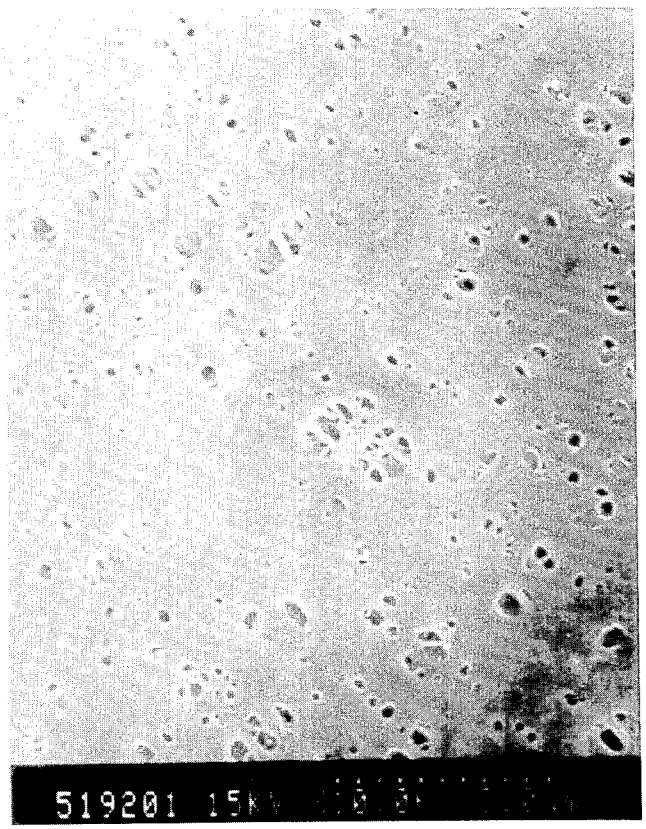
FIG. 5 is a SEM of 10,000 magnifications showing the outside surface of the porous tube obtained in Example 1.

The scanning electron microphotographs of the surfaces of the polymer tube thus formed are shown in FIG. 4 (inside surface) and FIG. 5 (outside surface) and the results of measuring the properties thereof are shown in Table 1 below.

From the results thereof, it can be seen that the polymer tube obtained is a porous tube having air permeability and also heat shrinkability.

In addition, the measurement methods of the properties and calculation standards shown in Table 1 are as follows.

Calculation of Porosity:

$$\text{Porosity} = \frac{(A) - (B)}{(A)} \times 100$$

(A): Density of TFE polymer tube before thermal expansion
(B): Density of TFE polymer tube after thermal expansion
Tensile Test:
Tensile speed: 200 mm/sec.
T.S.: Tensitile Strength
El: Elongation Gas Permeability:
Performed according JIS P-8117-1980
Apparatus Used: Gurley's Densometer, made by Tester Sangyo K.K.
Heat Recovery Test:
After keeping the TFE polymer tube formed by expansion in the heating furnace at 360° C. for 5 minutes, the apparatus containing the polymer tube is taken out from the furnace, and cooled to room temperature, and then the dimensions of the expanded polymer tube were compared with those of the original polymer tube before expansion.

EXAMPLE 2

A sintered TFE polymer tube formed as in Example 1 was mounted on the apparatus as used in Example 1. The lengths L and L' (in FIG. 2) of the TFE polymer tube were set to 400 mm and 150 mm, respectively, without fixing the longitudinal direction restraining screw nails so that the polymer tube expanded 1.75 times in both the radial direction and the longitudinal direction.

Then, the same operation as Example 1 was performed and after cooling, a porous TFE polymer tube of 27 mm in outside diameter and 700 mm in length was obtained. The expanded portion of the polymer tube obtained was opaque and white.

Figure 6:
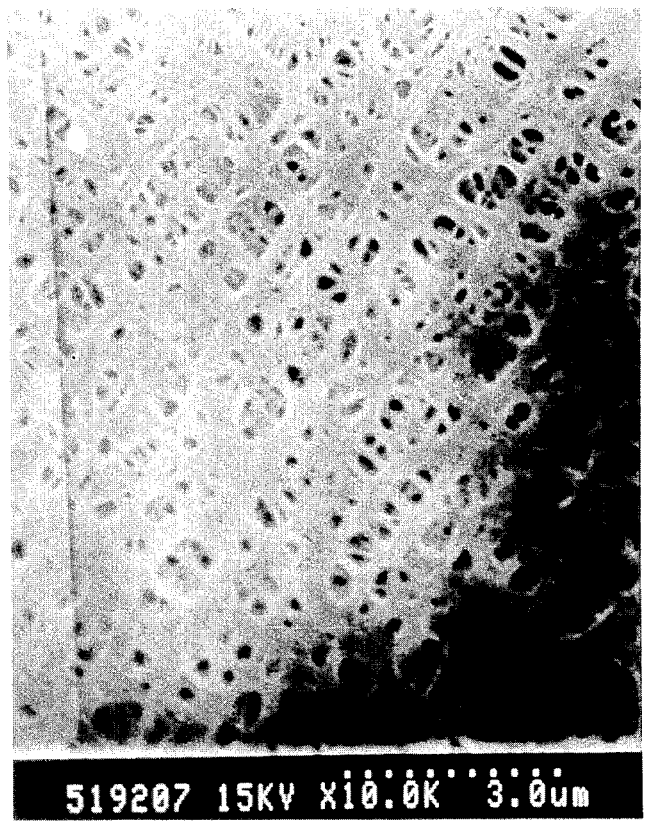
FIG. 6 is a SEM of 10,000 magnifications showing the inside surface of the tube obtained in Example 2.
Figure 7:
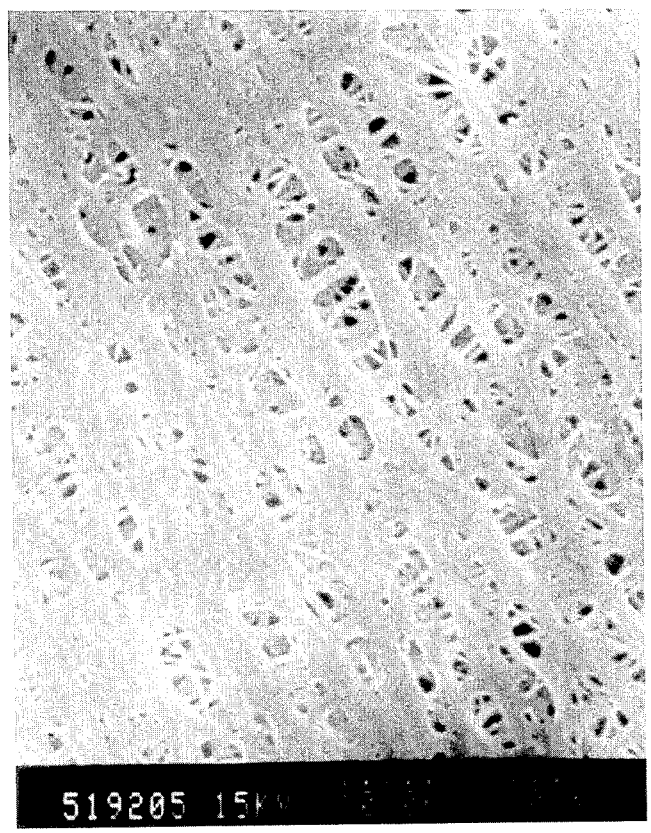
FIG. 7 is a SEM of 10,000 magnifications showing the outside surface of the porous tube obtained in Example 2.

The scanning electron microphotographs of the surfaces of the polymer tube are shown in FIG. 6 (inside surface) and FIG. 7 (outside surface), and the results of measuring the properties thereof are shown in Table 1 below.

From these results, it can be seen that the polymer tube thus obtained is a porous polymer tube having gas permeability and also heat shrinkability.

EXAMPLE 3

A sintered TFE polymer tube molded as in Example 1 was treated by the same procedure as in Example 2 except the heating temperature and the pressure applied were changed to 280° C. and 3.4 kg/cm², respectively.

After cooling, a TFE polymer tube of 27 mm in outside diameter and 700 mm in length was obtained.

Figure 8:
FIG. 8 is a SEM of 10,000 magnifications showing the inside surface of the porous tube obtained in Example 3.
Figure 9:
FIG. 9 is a SEM of 10,000 magnifications showing the outside surface of the porous tube obtained in Example 3.

The expanded portion of the polymer tube was opaque and white. The scanning electron microphotographs of the surfaces of the polymer tube are shown in FIG. 8 (inside surface) and FIG. 9 (outside surface), and the results of measuring the properties thereof are shown in Table 1 below.

From these results, it can be seen that the polymer tube is a porous tube having air permeability and also heat shrinkability.

COMPARISON EXAMPLE 1

A sintered TFE polymer tube molded as in Example 1 was treated by the same procedure as in Example 1 except that the heating temperature was changed to 325° C.

After cooling, a TFE polymer tube of 27 mm in outside diameter and 400 mm in length was obtained.

The expanded portion of the polymer tube obtained was transparent, and the properties of the polymer tube are shown in Table 1 below.

From the results, it can be seen that the polymer tube is a non-porous tube not having air permeability and having heat shrinkability.

EXAMPLE 4

By following the same procedure as in Example 1 using a powder of a copolymer of tetrafluoroethylene and 0.08% by weight of perfluoroalkyl vinyl ether, a sintered TFE polymer tube of 7 mm in inside diameter and 1 mm in thickness was obtained. The polymer tube was treated in the same procedure as in Example 1 except that the heating temperature and the pressure applied were changed to 250° C. and 5.1 kg/cm², respectively.

The external appearance of the polymer tube obtained was the same as that obtained in Example 1.

Figure 10:
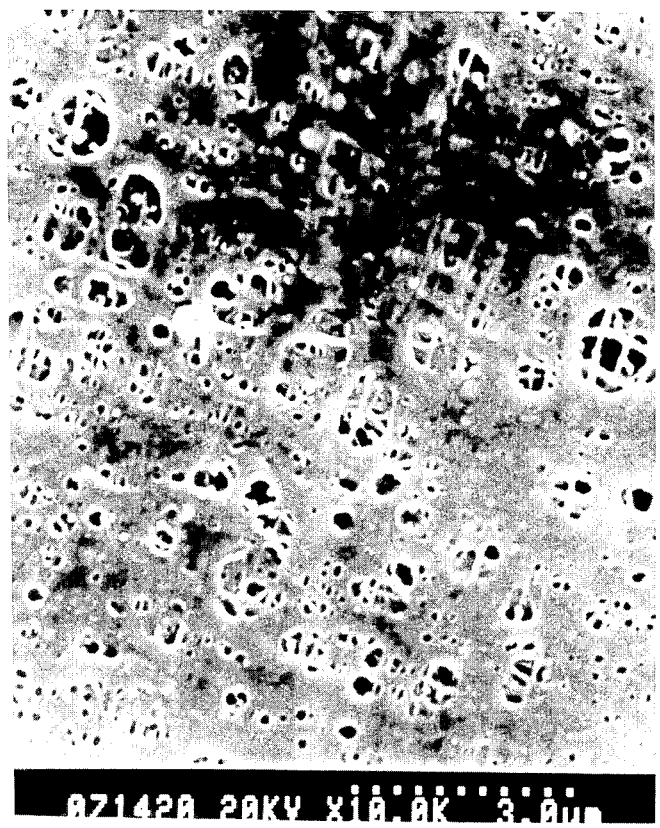
FIG. 10 is a SEM of 10,000 magnifications showing the inside surface of the porous tube obtained in Example 4.
Figure 11:
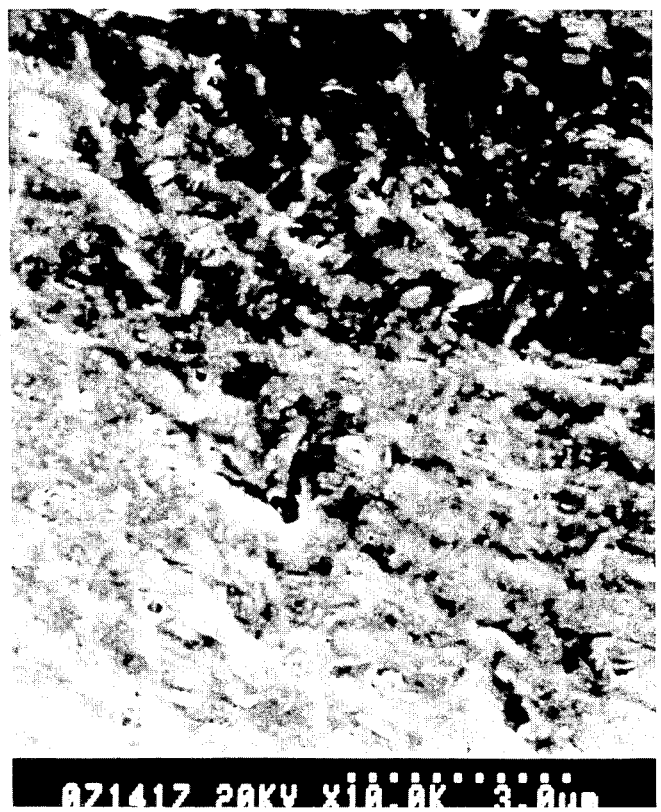
FIG. 11 is a SEM of 10,000 magnifications showing the outside surface of the tube obtained in Example 4.

The scanning electron microphotographs of the surfaces of the polymer tube are shown in FIG. 10 (inside surface) and FIG. 11 (outside surface), and the properties thereof are shown in Table 1 below.

From these results, it can be seen that the polymer tube is a porous tube having air permeability and also heat shrinkability.

EXAMPLE 5

A sintered TFE polymer tube produced as in Example 4 was mounted on the apparatus as used in Example 1. The lengths L and L' (in FIG. 2) of the polymer tube were set to 500 mm and 100 mm, respectively, without fixing the longitudinal direction expansion restraining screw nails so that the TFE polymer tube expanded to 1.4 times in both the radial direction and the longitudinal direction.

Figure 12:
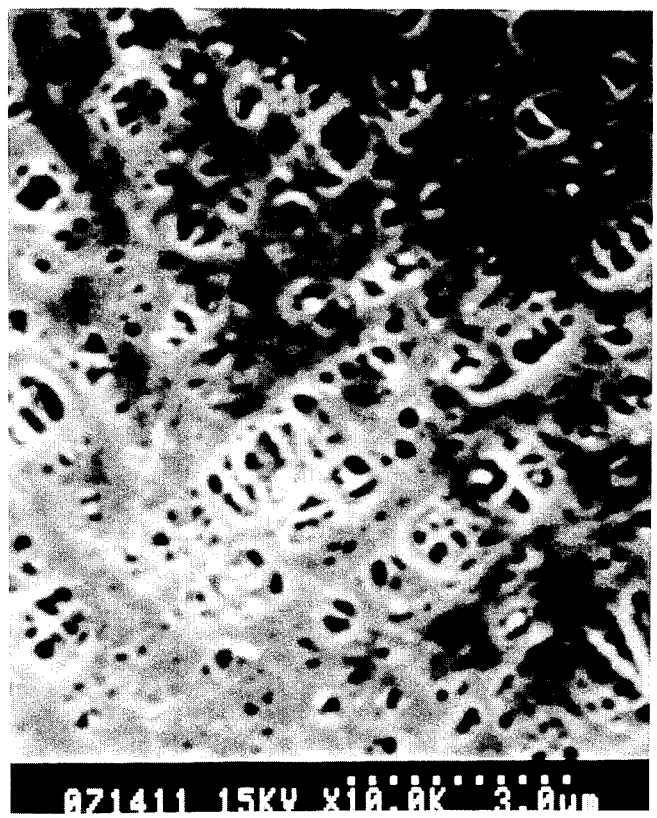
FIG. 12 is a SEM of 10,000 magnifications showing the inside surface of the porous tube obtained in Example 5.
Figure 13:
FIG. 13 is a SEM of 10,000 magnifications showing the outside surface of the tube obtained in Example 5.

Then, the polymer tube was treated in the same procedure as in Example 4 and after cooling, a porous TFE polymer tube of 27 mm in outside diameter and 700 mm in length was obtained. The expanded portion of the polymer tube was opaque and white. The scanning electron microphotographs of the surfaces of the polymer tube are shown in FIG. 12 (inside surface) and FIG. 13 (outside surface), and the properties thereof are shown in Table 1 below.

From the results, it can be seen that the polymer tube is a porous tube having air permeability and also heat shrinkability.

COMPARISON EXAMPLE 2

A sintered TFE polymer tube was molded under the same conditions as in Example 4 except that the heating temperature was changed to 320° C.

After cooling, a TFE polymer tube of 27 mm in outside diameter and 400 mm in length was obtained.

The expanded portion of the polymer tube was transparent. The properties of the polymer tube are shown in Table 1.

From these results, it can be seen that the polymer tube is a non-porous tube not having air permeability and having heat shrinkage.

TABLE 1

| | Temp. (°C.) | Expanding Direction | Density (g/cc) | Porosity (%) | Radial Direction Strength T.S. | Radial Direction Strength EI (%) | Longitudinal Direction T.S. | Longitudinal Direction IE (%) | Permeability (sec/100 cc) | Heat Recovery Test (360° C. × 5 min.) |
|---|---|---|---|---|---|---|---|---|---|---|
| Example 1 | 300 | Radial direction only | 1.65 | 24 | 750 | 50 | 470 | 300 | 20,000 | Original form recovered |
| Example 2 | 300 | Both directions | 1.06 | 51 | 450 | 60 | 530 | 100 | 2,100 | Original form recovered |
| Example 3 | 290 | Both directions | 1.04 | 52 | 420 | 50 | 410 | 150 | 2,000 | Original form recovered |
| Comparison Example 1 | 325 | Radial direction only | 2.16 | 0 | 825 | 25 | 500 | 350 | ∞ | Original form recovered |
| Example 4 | 250 | Radial direction only | 1.51 | 30 | 715 | 55 | 490 | ·185 | 30,000 | Original form recovered |
| Example 5 | 250 | Both directions | 1.25 | 40 | 560 | 50 | 420 | 145 | 2,700 | Original form recovered |
| Comparison Example 2 | | Radial direction only | 2.14 | 0 | 860 | 60 | 385 | 385 | ∞ | Original form recovered |

T.S.: Tensile strength (kg/cm²),
El: Elongation (%)
Both directions: Radial and longitudinal directions As described above, according to the present invention, a TFE polymer tube which is porous and has heat-shrinkability can be easily obtained.

While the invention has been described in detail and with reference to specific embodiments thereof, it will be apparent to one skilled in the art that various changes and modifications can be made therein without departing from the spirit and scope thereof.

What is claimed is:

1. A porous heat shrinkable tube produced by the process comprising:
    paste-extrusion molding a powder of a tetrafluoroethylene polymer to form a tetrafluoroethylene polymer tube;
    sintering said tetrafluoroethylene polymer tube;
    applying pressure to the inside of said tetrafluoroethylene polymer tube and heating to a temperature not higher than the melting point of said tetrafluoroethylene polymer thereby expanding said tetrafluoroethylene polymer tube in the radial and longitudinal direction of said polymer tube, and cooling said tube.

2. A porous, heat shrinkable tube produced by the process according to claim 1 comprising a tetrafluoroethylene polymer, said heat shrinkable tube having a porosity of from 10 to 80%, and a gas permeability of from 100 to 100,000 sec./100 c.c.

3. The porous, heat shrinkable tube produced by the process according to claim 1 wherein the said polymer tube is expanded at an expansion rate of from 1.5 to 5 times in said radial direction and up to 3 times in said longitudinal direction.

4. A porous heat shrinkable tube produced by the process as in claim 1, wherein said tetrafluoroethylene polymer contains at least one of perfluoroalkyl vinyl ether, chlorotrifluoroethylene, and hexafluoropropylene as a copolymerizable monomer in an amount of not more than 2% by weight.

5. The product produced by the process according to claim 1 wherein said sintering occurs at a temperature of 360° C.

* * * * *